United States Patent [19]

Kleinstück et al.

[11] Patent Number: 5,523,023

[45] Date of Patent: Jun. 4, 1996

[54] WATER TREATMENT/CLEANING COMPOSITION COMPRISING POLYASPARTIC ACID OR DERIVATIVES THEREOF AND PHOSPHONIC ACID

[75] Inventors: Roland Kleinstück, Bergisch Gladbach; Hermann Sicius, Düsseldorf; Torsten Groth; Winfried Joentgen, both of Cologne, all of Germany

[73] Assignee: Bayer AG, Leverkusen, Germany

[21] Appl. No.: 319,994

[22] Filed: Oct. 7, 1994

[30] Foreign Application Priority Data

Mar. 14, 1994 [DE] Germany .......................... 44 08 478.1

[51] Int. Cl.⁶ ................ C11D 3/37; C11D 3/28; C11D 3/33; C11D 3/36
[52] U.S. Cl. ............... 252/542; 252/174.16; 252/174.23; 252/180; 252/546; 252/DIG. 2; 252/DIG. 10; 252/DIG. 11
[58] Field of Search .................. 252/174.23, DIG. 2, 252/542, 546, 524, 527, 142, 146, 147, 148, 545, 526, DIG. 11, 174.16, 180, DIG. 10

[56] References Cited

U.S. PATENT DOCUMENTS

| | | | |
|---|---|---|---|
| 3,288,846 | 11/1966 | Irani et al. | 562/16 |
| 3,846,380 | 11/1974 | Fujimoto et al. | 525/328.2 |
| 3,886,204 | 5/1975 | Geffers et al. | 562/24 |
| 4,534,881 | 8/1985 | Sikes et al. | 252/180 |
| 4,806,259 | 2/1989 | Amjad | 252/80 |
| 4,839,461 | 6/1989 | Boehmke | 528/363 |
| 4,935,065 | 6/1990 | Bull | 134/22.13 |
| 5,057,597 | 10/1991 | Koskan | 528/328 |
| 5,116,513 | 5/1992 | Koskan et al. | 210/698 |
| 5,152,902 | 10/1992 | Koskan et al. | 210/698 |
| 5,219,986 | 6/1993 | Cassata | 530/324 |
| 5,266,237 | 11/1993 | Freeman et al. | 252/542 |
| 5,284,512 | 2/1994 | Koskan et al. | 106/416 |
| 5,286,810 | 2/1994 | Wood | 525/421 |
| 5,288,783 | 2/1994 | Wood | 525/418 |
| 5,306,429 | 4/1994 | Wood et al. | 210/698 |
| 5,318,728 | 6/1994 | Surutzidis et al. | 252/548 |
| 5,324,477 | 6/1994 | Schroeder et al. | 422/37 |
| 5,328,631 | 7/1994 | Du Vosel et al. | 252/174.23 |
| 5,328,690 | 7/1994 | Sikes | 424/401 |
| 5,357,004 | 10/1994 | Calton et al. | 525/435 |
| 5,367,047 | 11/1994 | Wood | 528/363 |
| 5,373,086 | 12/1994 | Koskan et al. | 528/328 |
| 5,389,303 | 2/1995 | Wood et al. | 252/544 |
| 5,391,642 | 2/1995 | Wood | 525/435 |
| 5,408,028 | 4/1995 | Wood et al. | 528/328 |
| 5,408,029 | 4/1995 | Wood et al. | 528/328 |

FOREIGN PATENT DOCUMENTS

| | | |
|---|---|---|
| 59-67375 | 4/1984 | Japan . |
| WO93/23452 | 11/1993 | WIPO . |
| 94/14939 | 7/1994 | WIPO . |
| WO9419288 | 9/1994 | WIPO . |

OTHER PUBLICATIONS

Chemical Abstract accession No. 101:77147, for JP 59–67375, Apr. 17, 1984.
Derwent Abstract accession No. 84–131330, for JP 59–67375, Apr. 17, 1984.
Kovacs et al., Chemical Studies of Polyaspartic Acids, *J. Org. Chem.*, vol. 26, pp. 1084–1091 (Apr. 1961).

*Primary Examiner*—Paul Lieberman
*Assistant Examiner*—Ardith Hertzog
*Attorney, Agent, or Firm*—Connolly & Hutz

[57] ABSTRACT

An improved composition for water treatment and for alkaline cleaning contains polyaspartic acid or a derivative thereof and a phosphonic acid.

16 Claims, No Drawings

WATER TREATMENT/CLEANING COMPOSITION COMPRISING POLYASPARTIC ACID OR DERIVATIVES THEREOF AND PHOSPHONIC ACID

The invention relates to a composition for water treatment and for alkaline cleaning and to a process for water treatment using this composition and to a process for alkaline cleaning using this composition.

When natural waters are used for industrial purposes, e.g. as cooling water or in industrial cleaning methods, the water used is purposefully or unintentionally physically and/or chemically altered. Thus, e.g. in open circulation cooling systems, temperature changes, concentration and a pH increase, which is produced by the carbon dioxide discharge in the cooling tower, are unavoidable. In industrial cleaning, e.g. in the food industry, in many applications the use of alkali, usually sodium hydroxide solution, is necessary in the cleanser solutions.

Both as a result of concentration and pH increase via $CO_2$ discharge and also as a result of addition of sodium hydroxide solution, the concentration of hardness-forming salts, in particular calcium ions and carbonate ions, increases. If the natural waters were in equilibrium (lime/carbonic acid equilibrium) before use, the increase in concentration of the hardness-forming salts leads to a supersaturation. To prevent limescale deposits (encrustations, scale), e.g. on heat exchange surfaces or on the material to be cleaned, the addition of additives ("scale inhibitors") is necessary.

The situation is similar in secondary recovery in the mineral oil sector:

The injected waters used must be treated, in some cases, by additives in order to prevent precipitation of inorganic salts such as calcium carbonate and calcium sulphate, strontium sulphate and barium sulphate in the formation and an impact on of the oil flow resulting therefrom.

A further, sometimes even the chief, purpose of the additive use in water treatment is the protection of metallic materials from corrosion. For example, when unalloyed carbon steels are used in open circulation cooling systems, sufficient corrosion inhibition is desired since conditions (oxygen saturation, salt enrichment) prevailing in such systems lead to an acceleration of corrosion.

The water treatment compositions and alkaline cleansers used according to the prior art are in need of further improvements:

Polyphosphates have only a limited solubility, so that the preparation of highly concentrated formulations is restricted and, moreover, they are hydrolytically unstable. Furthermore, their relatively high phosphorus content is criticised.

Phosphonates of the type nitrilo-tris-methylenephosphonic acid and 1-hydroxy-ethane-1,1-diphosphonic acid are technically advanced products in comparison with polyphosphates. They show a good hydrolysis stability and good efficacy as scale inhibitors, but have a relatively high phosphoric content.

2-phosphono-butane-1,2,4-tricarboxylic acid, in comparison with the other phosphonates, exhibit a further improved scale-inhibiting effectivity with considerably improved stability with respect to hypochlorite and hypobromite or chlorine and bromine, which are used as biocides and disinfectants. The phosphorus content of this product is considerably reduced in comparison with the other phosphonates.

Polyacrylates, copolymers based on acrylic acid and other analogous polycarboxylic acids having C-C chains are usually phosphorus-free products, but have the disadvantage of a corrosion-inhibiting and scale-inhibiting action which is unsatisfactory for many applications.

All the organic compounds mentioned hitherto share only a slight biodegradability. This is frequently a precondition for their use, e.g., the use of easily biodegradable additives in open circulation cooling systems, because of the conditions prevailing in such systems, would lead to the degradation of the additives even in the system. In other applications, e.g. having very low residence times in the system, in contrast, an easy biodegradability could have a less interfering effect.

An easy biodegradability is in any case advantageous when the additives pass into the outfall—which occurs frequently—after use.

Therefore, the development of easily or more easily biodegradable additives for water treatment and use in alkaline cleansers is a technically and ecologically expedient aim.

A first step for this has been made by the development of the polycarboxylic acid polyaspartic acid (PAA) which shows biodegradability. However, the effects of PAA as a scale- and corrosion-inhibitor are insufficient.

The present invention relates to a composition for water treatment, and for use in alkaline cleansers, containing polyaspartic acid or a derivative thereof and a phosphonic acid. In a preferred embodiment, the polyaspartic acid or derivative thereof and the phosphonic acid are present in a weight ratio of 10:90 to 90:10. The polyaspartic acid is preferably used as a salt, in particular as a sodium salt or potassium salt. However, it is also possible to use a derivative of polyaspartic acid, for example the anhydride of polyaspartic acid, viz polysuccinimide. This can convert into polyaspartic acid as a result of hydrolysis under suitable conditions during use. The phosphonic acid can be used as free acid or as salt, in particular as sodium salt or potassium salt. For the purposes of the present invention, polyaspartic acid and phosphonic acid are also taken to mean salts of these acids.

The preparation and use of polyaspartic acid (PAA) and derivatives thereof has been for a long time subject-matter of numerous publications and patents.

Thus the preparation can be carried out by thermal polycondensation of aspartic acid (J. Org. Chem. 26, 1084 (1961)).

U.S. Pat. No. 4,839,461 (=EP-A 0 256 366) describes the preparation of polyaspartic acid from maleic anhydride, water and ammonia. Maleic anhydride is converted into the monoammonium salt in aqueous medium with addition of concentrated ammonia solution.

In a preferred embodiment, the polyaspartic acid is prepared in that the monoammonium salt of maleic acid is subjected to a thermal, if required continuous, polymerization, preferably at 150° to 180° C. in a reactor with a residence time of 5 to 300 minutes and the resulting polysuccinimide is converted by hydrolysis to polyaspartic acid or a salt thereof.

The polyaspartic acid essentially contains, in a preferred embodiment, repeating units of the following structure:

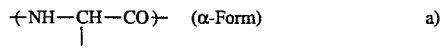 (α-Form)     a)

and

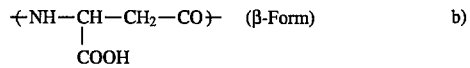 (β-Form)     b)

The proportion of the β-form is generally more than 50%, in particular more than 70%.

In addition to the repeating polyaspartic acid units a) and b), other repeating units can also be contained therein, e.g.:

c) malic acid units of the formula

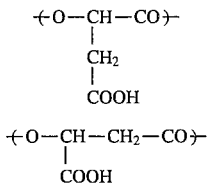

d) maleic acid units of the formula

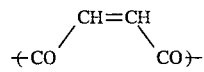

e) fumaric acid units of the formula

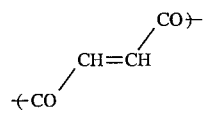

Preference is given to polymers having a molecular weight according to gel-permeation chromatographic analysis of from 500 to 10,000, preferably 1,000 to 5,000, particularly preferably 2,000 to 4,000.

Preferred phosphonic acids are phosphonocarboxylic acids, in particular phosphonocarboxylic acids having 3 to 10 C atoms. Particularly preferred phosphonocarboxylic acids of this type are phosphonosuccinic acid, phosphonopropionic acid and especially 2-phosphonobutane-1,2,4-tricarboxylic acid, abbreviated below as PBTC. PBTC is the active compound in the product Bayhibit® AM produced by Bayer AG. Other suitable phosphonic acids are, for example, those which have an amino or hydroxyl function, in particular nitrilo-tris-methylenephosphonic acid and the higher analogs, such as ethylenediaminetetrakis(methylenephosphonic acid) and diethylenetriaminepentakis(methylenephosphonic acid) and N-oxides thereof; 1-hydroxyethane-1,1-diphosphonic acid, hydroxyphosphono acetic acid.

The compositions according to the invention can also be used in this case with one or more substances which have proved to be useful for the respective application. Examples of such further components are:

Zinc salts, molybdates, borates, silicates, azoles (e.g. tolyltriazole or benzotriazole), other phosphonic acids, polymers and copolymers based on acrylic acid, methacrylic acid or maleic acid, ligninsulphonates, tannins, phosphates, complexing agents, citric acid, tartaric acid, gluconic acid, surfactants, biocides and disinfectants. It is obvious to those skilled in the art that instead of acids (e.g. "phosphonic acids") their salts ("phosphonates") can alternatively be used and vice versa.

The compositions according to the invention can be used in many ways, for example as scale inhibitors and as corrosion inhibitors. Areas of application of such compositions can be, e.g.: water treatment (e.g. treatment of cooling waters, process waters, gas scrubbing waters, injection waters in secondary oil recovery and water treatment in mining) and industrial and institutional cleaning applications (e.g. cleaning of vessels and equipment in the food industry, bottle washing, for institutional dishwashers and washing agents).

The present invention further relates to a process for water treatment, which is characterized in that the composition according to the invention is introduced into the water to be treated.

The present invention further relates to a process for alkaline cleaning, characterized in that the composition according to the invention is used as an encrustation inhibitor/sequestrant.

The process for water treatment is to be described below on the basis of examples: e.g. the compositions according to the invention are added to the feed water in concentrations between about 0.1 and 10 mg/l of active compound to prevent encrustations and scale during use in cooling systems with fresh water cooling.

In the cooling circuits, the metering of the additives to prevent scale and/or corrosion is frequently rate-dependent based on the make-up water. The concentrations are between about 1 and 50 mg/l of active compounds in the circulating cooling water.

In sea water desalination by distillation in MSF (multistage flash) and VP (vapour compression) plants, encrustations on the heat exchange surfaces are prevented by additive additions of about 1 to 5 mg/l of active compounds to the feed sea water.

The dosages required in RO (reverse osmosis) plants are generally markedly lower because of the process-related lower maximum temperatures.

The process for using the compositions according to the invention in alkaline cleaning will be described as follows:

The active compound concentrations used in alkaline cleaning to inhibit encrustation and for sequestration depend, in particular, on the technical and physical conditions, such as pHs, residence times, temperatures and water hardness.

Whereas active compound concentrations significantly below 100 mg/l generally 5 to 80 mg/l are frequently satisfactory in the weak alkaline range (pH to about 10) at temperatures below 60° C. and with relatively short residence times, at higher alkali concentrations and temperatures rates of over 100 mg/l to 300 mg/l are occasionally required.

In the following examples, a polyaspartic acid (PAA) having a molecular weight of approximately 3000 and a β-share of approx. 70% is used (as sodium salt).

EXAMPLE 1

Determination of the threshold effect (inhibition of the crystallization of calcium carbonate from supersaturated aqueous solutions)

1. Parameters of the synthetic tap water used

| Water parameter | | |
|---|---|---|
| Ion Concentration (mg/l) | $Ca^{2+}$ | 100 |
| | $Mg^{2+}$ | 12 |
| | $Na^+$ | 145 |
| | $HCO_3^-$ | 195 |
| | $SO_4^{2-}$ | 197 |
| | $Cl^-$ | 177 |
| Water hardness (calculated as ppm of $CaCO_3$) | | 300 |

The pH is adjusted to 11 by addition of sodium hydroxide solution.

The experimental temperature is 60° C.

2. Experimental procedure

The inhibitors are added at a defined concentration (e.g. 50 mg/l) to the abovementioned water. The solutions are poured into glass bottles each having a volume of 1 liter and one glass rod per bottle is further added in each case. The bottles are then sealed and stored at the abovementioned temperature for 24 h.

After the end of the experiment the glass rod is examined for possible encrustations and the bottle bottom is examined for deposit (sludge). Finally, the solution is filtered through a 0.45 μm membrane filter and then titrated with EDTA solution for determining the residual hardness. The residual hardness (%) is calculated via the following equation:

$$\text{Stabilized residual hardness (\%)} = 100 \cdot \frac{R_x - R_o}{R_a - R_o}$$

$R_x$=residual hardness of sample X
$R_a$=initial hardness
$R_o$=residual hardness of the blank sample.

The optical evaluation of the formation of encrustations and/or sludge is performed as follows:

—: no encrustation or sludge
O: encrustation X: sludge
Indices
1: weak 2: medium 3: strong 3. Results These are listed in the table. They show that under conditions as occur, e.g., in the rinsing section in the bottle washing, mixtures having a synergistic activity are obtainable by combination of PBTC and PAA.

TABLE 1

| Inhibitor | Concentration of active compound (mg/l) | Appearance of the solution after 24 h | Stabilized residual hardness (%) |
|---|---|---|---|
| Blank sample | — | $O_2$ | 0 |
| PBTC | 50 | $X_1$ | 78.9 |
| PBTC:PAA 3:1 | 50 | $X_1$ | 80.7 |
| PBTC:PAA 3:1 | 50 | $X_1$ | 86.7 |
| PAA | 50 | $O_3X_{0-1}$ | 23.5 |

EXAMPLE 2

Inhibition of corrosion of carbon steel

1. For parameters of the water used, see Example 1
2. Experimental procedure

4 Pickled steel pipe rings of ST 35 (diameter 35 mm, length 40 mm, weight approximately 70 g) are attached in each case to a plastic stirrer and agitated at a velocity of 0.6 m/s at room temperature in an aquarium (24 cm high, 30 cm long, 22 cm wide) having a volume of 12 liters of cooling water.

At the beginning of the experiment, the aquarium vessels are filled with cooling water which contains twice the respective indicated inhibitor concentration.

During the experiment, cooling water having the inhibitor concentration indicated is then continuously pumped through the aquaria at a rate of 0.5 l/h.

After 4 days, the pipe rings are again pickled and the weight losses are determined.

Pickling of the pipe rings:

1. Before the experiment
   a) the pipe rings are washed with dichloro ethane and acetone,
   b) pickled for approximately 1 min in 10% strength HCl at 80° C.,
   c) washed with tap water, demineralized water and 2×with acetone,
   d) dried in a warm air stream (hair-dryer) stored in a desiccator and weighed 2. After the experiment,
   a) the pipe rings are washed well with tap water,
   b) pickled for 30 s in 10% strength HCl at 80° C.
   c) as 1. c)
   d) as 1. d)

Corrosion rate: 1) in $g/m^2/d$: (weight loss (g)–0.0037)× 27.02

3. Experimental results in water from Example 1

| Inhibitor | Total concentration of active compounds (mg/l) | Corrosion (mm/a ≜ $g/m^2/d$) | |
|---|---|---|---|
| PBTC | 20 | 0.23 | 4.6 |
| PBTC:PAA | | | |
| 80:20 | 20 | 0.21 | 4.2 |
| 60:40 | 20 | 0.14 | 2.9 |
| 40:60 | 20 | 0.92 | 18.7 |
| PAA | 20 | 0.69 | 14.1 |
| (without inhibitor) | — | approx. 0.7–1.0 | approx. 14–20 |

4. Experimental results in water which contained 3 times the salt concentration of Example 1

| Inhibitor | Total concentration of active compounds (mg/l) | Corrosion (mm/a ≜ $g/m^2/d$) | |
|---|---|---|---|
| PBTC | 20 | 0.12 | 2.5 |
| PBTC:PAA | | | |
| 80:20 | 20 | 0.087 | 1.8 |
| 60:40 | 20 | 0.079 | 1.6 |
| 20:80 | 20 | 0.28 | 5.7 |
| PAA | 20 | 0.26 | 5.2 |
| (without inhibitor) | — | approx. 0.25–0.5 | approx. 5–10 |

What is claimed is:

1. Composition for water treatment, and for use in alkaline cleansers, containing polyaspartic acid and phosphonobutanetricarboxylic acid, said polyaspartic acid and said phosphonobutanetricarboxylic acid present in a weight ratio of polyaspartic acid:phosphonobutanetricarboxylic acid of 3:1 to 1:4.

2. Composition according to claim 1, wherein the polyaspartic acid is essentially a β-polyaspartic acid having a molecular weight of from 1,000 to 10,000.

3. Composition according to claim 1, characterized in that the phosphonobutanetricarboxylic acid is 2-phosphono-butane-1,2,4-tricarboxylic acid.

4. Composition for water treatment, and for use in alkaline cleansers, containing: (i) a salt of polyaspartic acid or an anhydride of polyaspartic acid; and (ii) phosphonobutanetricarboxylic acid, wherein the weight ratio of (i):(ii) is 3:1 to 1:4.

5. Composition according to claim 4, wherein said composition consists essentially of: (i) a salt of polyaspartic acid; and (ii) phosphonobutanetricarboxylic acid, wherein the weight ratio of (i):(ii) is 3:1 to 1:4.

6. Composition according to claim 5, wherein said salt of polyaspartic acid is a sodium salt or a potassium salt.

7. Composition of claim 5, wherein the composition contains from 25–75% by weight of said phosphonobutanetricarboxylic acid and form 75–25% by weight of said salt of polyaspartic acid.

8. Composition according to claim 4, wherein said composition consists essentially of: (i) an anhydride of polyaspartic acid; and (ii) phosphonobutanetricarboxy acid, wherein the weight ratio of (i):(ii) is 3:1 to 1:4.

9. Composition according to claim 8, wherein said anhydride of polyaspartic acid is polysuccinimide.

10. Process for cleaning in an alkaline environment, comprising adding a composition according to claim 1 to water to form a cleaning solution and then contacting the cleaning solution with a vessel or piece of equipment from the food or beverage industry.

11. Process according to claim 10, wherein the cleaning solution is used in a dishwasher.

12. Process according to claim 10, wherein said alkaline environment has a pH of at least 10.

13. Process according to claim 10, wherein said alkaline environment has a pH of at least 11.

14. Process according to claim 10, wherein the composition contains from 60–80% by weight of said phosphonobutanetricarboxylic acid and from 20–40% by weight of said polyaspartic acid.

15. Process according to claim 10, wherein the composition contains from 25–75% by weight of said phosphonobutanetricarboxylic acid and from 75–25% by weight of said polyaspartic acid.

16. Process for cleaning in an alkaline environment comprising adding a composition according to claim 1 to water to form a cleaning solution and then contacting the cleaning solution with at least one bottle.

* * * * *

UNITED STATES PATENT AND TRADEMARK OFFICE
CERTIFICATE OF CORRECTION

PATENT NO. : 5,523,023
DATED : JUNE 4, 1996
INVENTOR(S) : KLEINSTÜCK ET AL.

It is certified that error appears in the above-indentified patent and that said Letters Patent is hereby corrected as shown below:

In Column 7, line 5, "form" should be --from--; and in Column 7, line 9, "phosphonobutanetricarboxy" should be --phosphonobutanetricarboxylic--.

Signed and Sealed this

Seventh Day of January, 1997

Attest:

BRUCE LEHMAN

*Attesting Officer*              *Commissioner of Patents and Trademarks*